(12) United States Patent
Zhou

(10) Patent No.: US 12,448,554 B2
(45) Date of Patent: Oct. 21, 2025

(54) METHOD OF PREPARING ENVIRONMENTALLY-FRIENDLY WATER-RESISTANT TANNIN-BASED WOOD ADHESIVE

(71) Applicant: Xiaojian Zhou, Yunnan (CN)

(72) Inventor: Xiaojian Zhou, Yunnan (CN)

(73) Assignee: Southwest Forestry University, Kunming (CN)

( * ) Notice: Subject to any disclaimer, the term of this patent is extended or adjusted under 35 U.S.C. 154(b) by 518 days.

(21) Appl. No.: 18/146,392

(22) Filed: Dec. 26, 2022

(65) Prior Publication Data

US 2023/0130576 A1    Apr. 27, 2023

(30) Foreign Application Priority Data

Aug. 18, 2022  (CN) .......................... 202210993654.3

(51) Int. Cl.
*C09J 175/02*  (2006.01)
*C09J 193/00*  (2006.01)
*C09J 197/00*  (2006.01)

(52) U.S. Cl.
CPC .................................. *C09J 197/00* (2013.01)

(58) Field of Classification Search
None
See application file for complete search history.

(56) References Cited

U.S. PATENT DOCUMENTS 4,540,802 A * 9/1985 Tomita ................. C08G 59/245
                                                            549/517
2018/0127399 A1 * 5/2018 Roumeas ............... C08G 59/06

FOREIGN PATENT DOCUMENTS

CN        111116867 A  *  5/2020   ........... C08G 59/022

OTHER PUBLICATIONS

Machine translation of CN-111116867-A (no date).*
Registry Data for CAS. No. 106-89-8 (no date).*

* cited by examiner

*Primary Examiner* — Michael J Feely

(57) ABSTRACT

An environmentally-friendly epoxy tannin resin based polyurea adhesive and its preparation method are provided. The method includes preparing the environmentally-friendly water-resistant tannin-based wood adhesive by graft copolymerization of epoxy tannin, which is obtained by epoxidation of tannin using epoxy chloropropane, with triethylene tetramine and subsequent deamination reaction of them with urea.

4 Claims, 2 Drawing Sheets

Bonding Strength of Plywood

| Adhesive sample | Raw materials (g) | | | | | Tensile strength (MPa) | | |
|---|---|---|---|---|---|---|---|---|
| | T | ET | TETA | Urea | 20 w% NaOH solution | 24h immersion in cold water | 3h immersion in 63°C water | 3h immersion in boiling water |
| Embodiment 1 | 0 | 5 | 4.84 | 2.78 | 45 | 0.92 | 0.62 | 0.62 |
| Embodiment 2 | 0 | 5 | 4.84 | 3.47 | 45 | 0.98 | 0.78 | 0.68 |
| Embodiment 3 | 0 | 5 | 4.84 | 4.17 | 45 | 0.72 | 0.75 | 0.70 |
| Contrast 1 | 0 | 5 | 4.84 | 0.69 | 45 | --- (Dissipated during immersion in cold water) | | |
| Contrast 2 | 0 | 5 | 4.84 | 5.56 | 45 | --- (Dissipated during immersion in cold water) | | |
| Contrast 3 | 0 | 5 | 4.84 | 0 | 45 | --- (Dissipated during immersion in cold water) | | |
| Contrast 4 | 0 | 5 | 0 | 3.47 | 45 | --- (Dissipated during immersion in cold water) | | |
| Contrast 5 | 5 | 0 | 4.84 | 3.47 | 45 | --- (Dissipated during immersion in cold water) | | |
| Contrast 6 | 0 | 5 | 4.84 | 3.47 | 45 | --- (Dissipated during immersion in cold water) | | |
| Contrast 7 | 0 | 5 | 4.84 | 3.47 | 45 | --- (Dissipated during immersion in cold water) | | |

Note: "---" represents no data

FIG.2

METHOD OF PREPARING ENVIRONMENTALLY-FRIENDLY WATER-RESISTANT TANNIN-BASED WOOD ADHESIVE

FIELD OF THE INVENTION

The invention relates to synthetic preparation of adhesives for wood-based panels and more particularly to a method of preparing environmentally-friendly water-resistant tannin-based wood adhesive.

BACKGROUND OF THE INVENTION

Adhesives are the core for preparation of wood-based panels. Without adhesives, there would be no wood-based panels industry. In recent years, the annual consumption of adhesives for wood-based panels exceeds 15 million tons, and urea-formaldehyde resin is widely used for its advantages of cheap raw materials, simple synthesis technology, excellent properties and light color of adhesive layers, accounting for about 90% of total quantity of adhesives for wood-based panels. However, urea-formaldehyde resin is still unsatisfactory for its formaldehyde release and unsatisfactory water resistance in use, so there is still room for improvement.

The technical route of copolycondensation synthesis, as one of effective technical routes for improvement of urea-formaldehyde resin, has made great research progress, and has also been applied in modification of urea-formaldehyde resin, resulting in synthesis into such copolycondensation resin adhesives as melamine-urea-formaldehyde copolycondensation resin adhesive (MUF), phenol-urea-formaldehyde copolycondensation resin adhesive (PUF) and biomass materials (tannin, lignin, protein and starch). The technical route of copolycondensation synthesis achieves the balance between properties of adhesives, with great application value.

To eliminate the effects of formaldehyde, predecessors and the team of patent designers have done a great deal of exploration, for examples, glyoxal, glutaraldehyde and other low toxicity and low volatility aldehydes have been used to prepare formaldehyde-free wood adhesives by synthesis, and polyamine compounds and urea have been used to prepare polyurea adhesives by deamination reaction using the one-step and one-pot method, which completely eliminate the effects of formaldehyde.

Tannin, as a biomass polyphenol flavonoid polymer, with the properties of phenol compounds, can replace phenol, resorcinol and other raw materials commonly used for adhesives for wood-based panels with the purpose of synthesis into tannin resin based wood adhesives. How to use the advantages of biomass materials and cheap ammoniac compounds such as urea to synthesize an environmentally-friendly water-resistant copolycondensation resin wood adhesive is of far-reaching significance.

Thus, the need for improvement still exists.

SUMMARY OF THE INVENTION

To solve the above problem, the invention provides an environmentally-friendly water-resistant wood adhesive and its preparation method.

Specifically, the following technical proposal is used for implementation:

1. An environmentally-friendly water-resistant tannin-based wood adhesive: the adhesive is prepared by graft copolymerization of epoxy tannin (ET), which is obtained by epoxidation of tannin using epoxy chloropropane, with triethylene tetramine (TETA) and then deamination reaction of them with urea (U).

Further, the quantity ratio of epoxy tannin, triethylene tetramine and urea is: $n_{ET}:n_{TETA}:n_U=1:1:(2-3)$.

Further, the preparation method of the epoxy tannin is: add tannin to epoxy chloropropane aqueous solution, and heat up to 80° C.; after a period of reaction, add to 20% NaOH aqueous solution for 3 h thermal reaction, then cool to room temperature, and repeat dilution, suction filtration and rotary evaporation with absolute ethyl alcohol and acetone for 3-5 times, to obtain epoxy tannin.

Further, the epoxide equivalent of epoxy tannin is 100-300 g/mol.

2. The above environmentally-friendly water-resistant tannin-based wood adhesive comprises the following steps:

(1) Adding epoxy tannin and triethylene tetramine in proportion [$n_{ET}:n_{TETA}=1:1$], transfer single-necked flask to oil bath pan after 4 h thermal reaction at 60° C., add urea after heating up to 120° C., and obtain epoxy tannin based polyurea prepolymer after 12 h thermal reaction;

(2) Preparing the epoxy tannin based polyurea prepolymer obtained by step (1) into 55-65% aqueous solution, which is an environmentally-friendly water-resistant tannin-based wood adhesive.

The tannin used in the invention come from natural agriculture and forestry plants, but not limited to that contained in a certain plant.

The invention also provides an epoxy tannin based polyurea adhesive prepared using the above method.

The beneficial effects of the invention are reflected in the following. The invention provides that the epoxy tannin based polyurea adhesive is prepared by epoxidation of tannin, grafting of epoxy tannin to triethylene tetramine (TETA) and deamination reaction with urea. Compared with previous polyurea adhesive prepared using aliphatic amine as the raw material, the invention leads epoxy tannin into polyurea system and introduces benzene ring in tannin structure, enabling π-π interaction between molecular chains of the prepared polyurea adhesive, increasing the cohesion of polyurea molecules, and thus improving the water resistance of resin.

The invention uses high active tannin as a natural plant polyphenol for synthesis into an epoxy tannin based polyurea adhesive, which has excellent water resistance and bonding strength; what is more, the raw material comes from biomass, renewable. An important feature of the invention is epoxidation of tannin with the purpose of improving the compatibility of tannin with triethylene tetramine and urea during subsequent reaction for preparation of the polyurea adhesive. According to the following Contrast 5, if tannin is not treated, the compounds formed by reaction of phenolic hydroxyl group with amino group under the given experimental conditions cannot be effectively cross-linked. Compared with traditional tannin resin adhesives and polyurea adhesives, the copolycondensation adhesive features good water resistance and no formaldehyde release, with a broad prospect in application.

The above and other objects, features and advantages of the invention will become apparent from the following detailed description taken with the accompanying drawings

BRIEF DESCRIPTION OF THE DRAWINGS

FIG. 2 is a table of bonding strength of plywood.

DETAILED DESCRIPTION OF THE INVENTION

Figure 1:
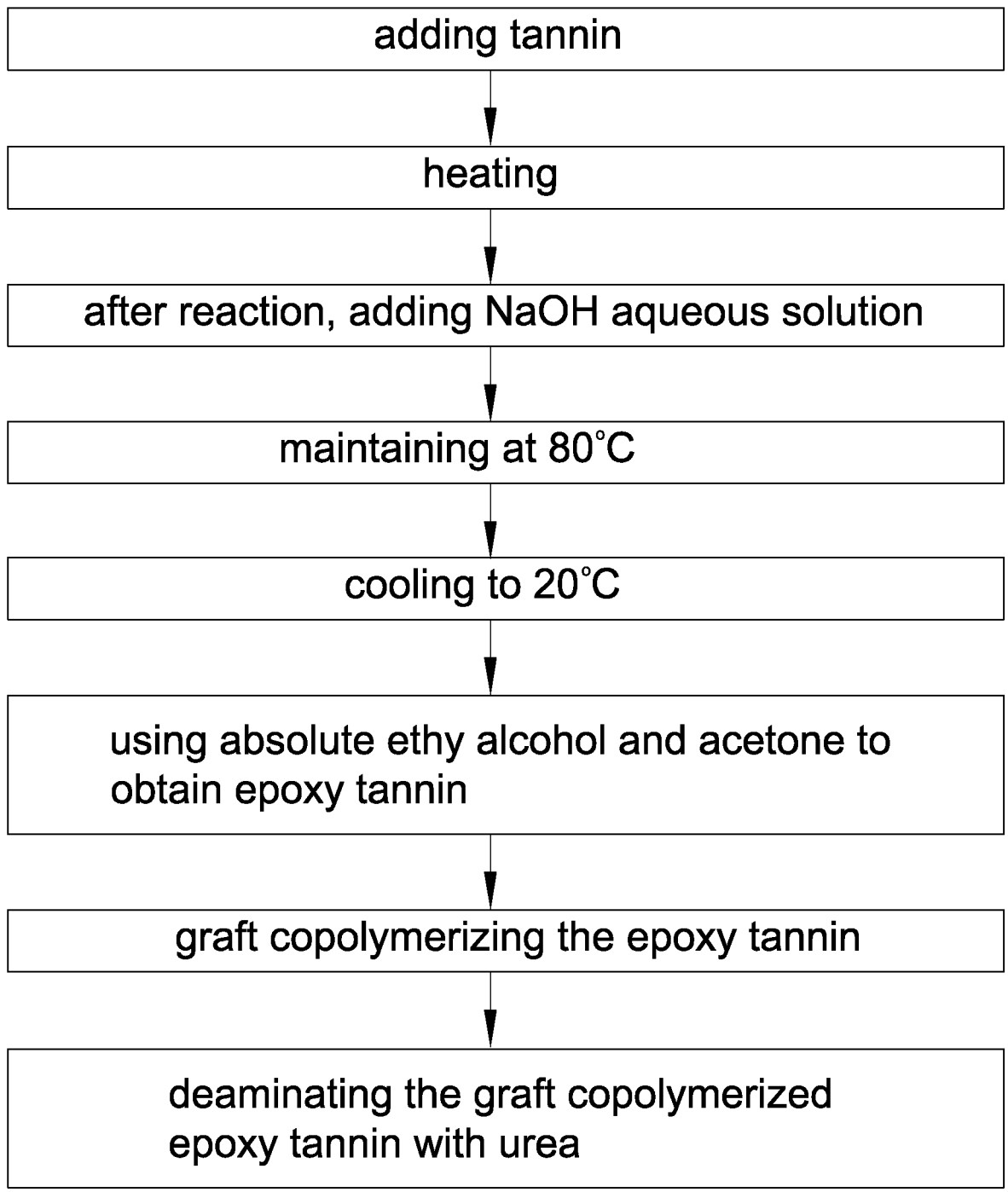
FIG. 1 is a flow chart of a method of preparing environmentally-friendly water-resistant tannin-based wood adhesive according to the invention.

Referring to FIG. 1, it illustrates a method of preparing environmentally-friendly water-resistant tannin-based wood adhesive of the invention. The method comprises the steps of: adding tannin to epoxy chloropropane aqueous solution; heating the epoxy chloropropane aqueous solution to 80° C.; after a predetermined period of time (e.g., 3 hours) of reaction, adding 20 wt % NaOH aqueous solution to the epoxy chloropropane aqueous solution; maintaining the epoxy chloropropane aqueous solution at 80° C. for three hours; cooling the epoxy chloropropane aqueous solution to 20° C.; using absolute ethyl alcohol and acetone to dilute, suction filter, and rotary evaporate the epoxy chloropropane aqueous solution for 3 to 5 times to obtain epoxy tannin; using triethylene tetramine to graft copolymerize the epoxy tannin; and deaminating the graft copolymerized epoxy tannin with urea to obtain the water-resistant tannin-based wood adhesive.

The following embodiments enables those skilled in the art to gain a more comprehensive understanding of the invention, but do not limit the invention in any way. Unless otherwise specified, % in the following embodiments refers to mass percent.

Embodiment 1: $n_{ET}:n_{TETA}:n_U=1:1:2$

Add 150 g epoxy chloropropane and 100 g distilled water to a three-necked flask equipped with a mechanical stirrer and a reflux condenser; after 30 min mechanical stirring at room temperature, weigh 30 g mimosa tannin, add it to the system, and heat up the system to 80° C.; weigh 45 g 20% sodium hydroxide solution in proportion [m(tannin):m(sodium hydroxide)=1:1.5], add it to the system slowly using a constant pressure dropping funnel; after adding sodium hydroxide solution, perform 80° C. thermal reaction for 3 h; after end of reaction, cool the obtained mixture to room temperature, dilute it to 1,000 mL using absolute ethyl alcohol, conduct suction filtration using a suction filter unit equipped with a 1 μm glass fiber filter membrane, then conduct rotary evaporation of the obtained filtrate by filtration (repeat this step twice), and repeat this step using acetone to obtain ET, and measure the epoxide equivalent of ET:EE=216 g/mol. Weigh 5 g ET and 4.84 g TETA in proportion, add them to a single-necked flask equipped with a magnetic rotor, and heat up to 60° C. for 4 h thermal reaction. Transfer the flask to an oil bath pan, heat up to 120° C., add 2.78 g urea, and after 12 h thermal reaction, prepare the obtained resin into 60% aqueous solution, which is adhesive.

Embodiment 2: $n_{ET}:n_{TETA}:n_U=1:1:2.5$

Add 150 g epoxy chloropropane and 100 g distilled water to a three-necked flask equipped with a mechanical stirrer and a reflux condenser; after 30 min mechanical stirring at room temperature, weigh 30 g mimosa tannin, add it to the system, and heat up the system to 80° C.; weigh 45 g 20% sodium hydroxide solution in proportion [m(tannin):m(sodium hydroxide)=1:1.5], add it to the system slowly using a constant pressure dropping funnel; after adding sodium hydroxide solution, perform 80° C. thermal reaction for 3 h; after end of reaction, cool the obtained mixture to room temperature, dilute it to 1,000 mL using absolute ethyl alcohol, conduct suction filtration using a suction filter unit equipped with a 1 μm glass fiber filter membrane, then conduct rotary evaporation of the obtained filtrate by filtration (repeat this step twice), and repeat this step using acetone to obtain ET, and measure the epoxide equivalent of ET:EE=216 g/mol. Weigh 5 g ET and 4.84 g TETA in proportion, add them to a single-necked flask equipped with a magnetic rotor, and heat up to 60° C. for 4 h thermal reaction. Transfer the flask to an oil bath pan, heat up to 120° C., add 3.47 g urea, and after 12 h thermal reaction, prepare the obtained resin into 60% aqueous solution, which is adhesive.

Embodiment 3: $n_{ET}:n_{TETA}:n_U=1:1:3$

Add 150 g epoxy chloropropane and 100 g distilled water to a three-necked flask equipped with a mechanical stirrer and a reflux condenser; after 30 min mechanical stirring at room temperature, weigh 30 g bayberry tannin, add it to the system, and heat up the system to 80° C.; weigh 45 g 20% sodium hydroxide solution in proportion [m(tannin):m(sodium hydroxide)=1:1.5], add it to the system slowly using a constant pressure dropping funnel; after adding sodium hydroxide solution, perform 80° C. thermal reaction for 3 h; after end of reaction, cool the obtained mixture to room temperature, dilute it to 1,000 mL using absolute ethyl alcohol, conduct suction filtration using a suction filter unit equipped with a 1 μm glass fiber filter membrane, then conduct rotary evaporation of the obtained filtrate by filtration (repeat this step twice), and repeat this step using acetone to obtain ET, and measure the epoxide equivalent of ET:EE=216 g/mol. Weigh 5 g ET and 4.84 g TETA in proportion, add them to a single-necked flask equipped with a magnetic rotor, and heat up to 60° C. for 4 h thermal reaction. Transfer the flask to an oil bath pan, heat up to 120° C., add 4.17 g urea, and after 12 h thermal reaction, prepare the obtained resin into 60% aqueous solution, which is adhesive.

Contrast 1: $n_{ET}:n_{TETA}:n_U=1:1:0.5$

Add 150 g epoxy chloropropane and 100 g distilled water to a three-necked flask equipped with a mechanical stirrer and a reflux condenser; after 30 min mechanical stirring at room temperature, weigh 30 g mimosa tannin, add it to the system, and heat up the system to 80° C.; weigh 45 g 20% sodium hydroxide solution in proportion [m(tannin):m(sodium hydroxide)=1:1.5], add it to the system slowly using a constant pressure dropping funnel; after adding sodium hydroxide solution, perform 80° C. thermal reaction for 3 h; after end of reaction, cool the obtained mixture to room temperature, dilute it to 1,000 mL using absolute ethyl alcohol, conduct suction filtration using a suction filter unit equipped with a 1 μm glass fiber filter membrane, then conduct rotary evaporation of the obtained filtrate by filtration (repeat this step twice), and repeat this step using acetone to obtain ET, and measure the epoxide equivalent of ET:EE=216 g/mol. Weigh 5 g ET and 4.84 g TETA in proportion, add them to a single-necked flask equipped with a magnetic rotor, and heat up to 60° C. for 4 h thermal reaction. Transfer the flask to an oil bath pan, heat up to 120° C., add 0.69 g urea, and after 12 h thermal reaction, prepare the obtained resin into 60% aqueous solution, which is adhesive.

Contrast 2: $n_{ET}:n_{TETA}:n_U=1:1:4$

Add 150 g epoxy chloropropane and 100 g distilled water to a three-necked flask equipped with a mechanical stirrer and a reflux condenser; after 30 min mechanical stirring at room temperature, weigh 30 g mimosa tannin, add it to the system, and heat up the system to 80° C.; weigh 45 g 20% sodium hydroxide solution in proportion [m(tannin):m(sodium hydroxide)=1:1.5], add it to the system slowly using a constant pressure dropping funnel; after adding sodium hydroxide solution, perform 80° C. thermal reaction for 3 h; after end of reaction, cool the obtained mixture to room temperature, dilute it to 1,000 mL using absolute ethyl alcohol, conduct suction filtration using a suction filter unit equipped with a 1 μm glass fiber filter membrane, then conduct rotary evaporation of the obtained filtrate by filtration (repeat this step twice), and repeat this step using acetone to obtain ET, and measure the epoxide equivalent of ET:EE=216 g/mol. Weigh 5 g ET and 4.84 g TETA in proportion, add them to a single-necked flask equipped with a magnetic rotor, and heat up to 60° C. for 4 h thermal reaction. Transfer the flask to an oil bath pan, heat up to 120° C., add 5.56 g urea, and after 12 h thermal reaction, prepare the obtained resin into 60% aqueous solution, which is adhesive.

Contrast 3: $n_{ET}:n_{TETA}:n_U=1:1:0$

Add 150 g epoxy chloropropane and 100 g distilled water to a three-necked flask equipped with a mechanical stirrer and a reflux condenser; after 30 min mechanical stirring at room temperature, weigh 30 g mimosa tannin, add it to the system, and heat up the system to 80° C.; weigh 45 g 20% sodium hydroxide solution in proportion [m(tannin):m(sodium hydroxide)=1:1.5], add it to the system slowly using a constant pressure dropping funnel; after adding sodium hydroxide solution, perform 80° C. thermal reaction for 3 h; after end of reaction, cool the obtained mixture to room temperature, dilute it to 1,000 mL using absolute ethyl alcohol, conduct suction filtration using a suction filter unit equipped with a 1 μm glass fiber filter membrane, then conduct rotary evaporation of the obtained filtrate by filtration (repeat this step twice), and repeat this step using acetone to obtain ET, and measure the epoxide equivalent of ET:EE=216 g/mol. Weigh 5 g ET and 4.84 g TETA in proportion, add them to a single-necked flask equipped with a magnetic rotor, and heat up to 60° C. for 4 h thermal reaction. Transfer the flask to an oil bath pan, heat up to 120° C., and after 12 h thermal reaction, prepare the obtained resin into 60% aqueous solution, which is adhesive.

Contrast 4: $n_{ET}:n_{TETA}:n_U=1:0:2.5$

Add 150 g epoxy chloropropane and 100 g distilled water to a three-necked flask equipped with a mechanical stirrer and a reflux condenser; after 30 min mechanical stirring at room temperature, weigh 30 g mimosa tannin, add it to the system, and heat up the system to 80° C.; weigh 45 g 20% sodium hydroxide solution in proportion [m(tannin):m(sodium hydroxide)=1:1.5], add it to the system slowly using a constant pressure dropping funnel; after adding sodium hydroxide solution, perform 80° C. thermal reaction for 3 h; after end of reaction, cool the obtained mixture to room temperature, dilute it to 1,000 mL using absolute ethyl alcohol, conduct suction filtration using a suction filter unit equipped with a 1 μm glass fiber filter membrane, then conduct rotary evaporation of the obtained filtrate by filtration (repeat this step twice), and repeat this step using acetone to obtain ET, and measure the epoxide equivalent of ET:EE=216 g/mol. Weigh 5 g ET in proportion, add them to a single-necked flask equipped with a magnetic rotor, and heat up to 60° C. for 4 h thermal reaction. Transfer the flask to an oil bath pan, heat up to 120° C., add 3.47 g urea, and after 12 h thermal reaction, prepare the obtained resin into 60% aqueous solution, which is adhesive.

Contrast 5: $n_T:n_{TETA}:n_U=1:1:2.5$

Add 30 g mimosa tannin and 100 g distilled water to a three-necked flask equipped with a mechanical stirrer and a reflux condenser; after stirring them evenly, heat up to 80° C. while stirring; weigh 45 g 20% sodium hydroxide solution in proportion [m(tannin):m(sodium hydroxide)=1:1.5], add it to the system slowly using a constant pressure dropping funnel; after adding sodium hydroxide solution, perform 80° C. thermal reaction for 3 h; after end of reaction, cool the obtained mixture to room temperature. Weigh 5 g tannin (T) and 4.84 g TETA in proportion, add them to a single-necked flask equipped with a magnetic rotor, and heat up to 60° C. for 4 h thermal reaction. Transfer the flask to an oil bath pan, heat up to 120° C., add 3.47 g urea, and after 12 h thermal reaction, prepare the obtained resin into 60% aqueous solution, which is adhesive.

Contrast 6: $n_{ET}:n_{TETA}:n_U=1:1:2.5$

The specific implementation method is shown in Embodiment 2; however, the difference is that the epoxide equivalent of ET in this contrast is 90 g/mol. Weigh 5 g ET and 4.84 g TETA in proportion, add them to a single-necked flask equipped with a magnetic rotor, and heat up to 60° C. for 4 h thermal reaction. Transfer the flask to an oil bath pan, heat up to 120° C., add 3.47 g urea, and after 12 h thermal reaction, prepare the obtained resin into 60% aqueous solution, which is adhesive.

Contrast 7: $n_{ET}:n_{TETA}:n_U=1:1:2.5$

The specific implementation method is shown in Embodiment 2; however, the difference is that the epoxide equivalent of ET in this contrast is 320 g/mol. Weigh 5 g ET and 4.84 g TETA in proportion, add them to a single-necked flask equipped with a magnetic rotor, and heat up to 60° C. for 4 h thermal reaction. Transfer the flask to an oil bath pan, heat up to 120° C., add 3.47 g urea, and after 12 h thermal reaction, prepare the obtained resin into 60% aqueous solution, which is adhesive.

The adhesives prepared using the above technology are used for preparation of three-layer poplar plywood; the double spread of lateral ply is 280 g/m$^2$; hot-pressing technology: pressure 1 MPa, time 1 min/mm, temperature 220° C. After placing the pressed plywood for 1 week, perform a bonding strength test; the test conditions are: 24 h immersion in cold water, 3 h immersion in 63° C. warm water, and 3 h immersion in boiling water.

Referring to FIG. 2, the specific test results are shown. The environmentally-friendly water-resistant tannin-based wood adhesive prepared using the method provided by the invention has excellent water resistance, which is an obvious advantage compared with contrasts.

While the invention has been described in terms of preferred embodiments, those skilled in the art will recognize that the invention can be practiced with modifications within the spirit and scope of the appended claims.

What is claimed is:

1. A method of preparing a water-resistant tannin-based wood adhesive, comprising the steps of:
   (a) adding tannin to an aqueous solution of epoxy chloropropane, resulting in a reactive aqueous solution;
   (b) heating the reactive aqueous solution to a reaction temperature of 80° C.;
   (c) after a predetermined period of time of reaction, adding 20 wt % NaOH aqueous solution to the reactive aqueous solution, resulting in a catalyzed reactive aqueous solution;
   (d) maintaining the catalyzed reactive aqueous solution at 80° C. for three hours, resulting in an aqueous solution of epoxidized tannin;

(e) cooling the aqueous solution of epoxidized tannin to 20° C.;

(f) purifying the aqueous solution of epoxidized tannin by repeating the following sequence 2 to 4 times: diluting the aqueous solution of epoxidized tannin with absolute ethyl alcohol, conducting suction filtration with a suction filter, and performing rotary evaporation of the filtrate; and subsequently performing the sequence with acetone in place of the absolute ethyl alcohol, to obtain an epoxidized tannin;

(g) grafting triethylene tetramine to the epoxidized tannin, to graft copolymerize the epoxidized tannin; and (h) deaminating the graft copolymerized epoxidized tannin with urea to obtain the water-resistant tannin-based wood adhesive.

2. The method of claim 1, wherein a quantity ratio of the epoxidized tannin, the triethylene tetramine, and the urea is $n_{epoxized\ tannin}: n_{triethylene\ tetramine}: n_{urea} = 1:1:(2\text{-}3)$.

3. The method of claim 1, wherein epoxide equivalent of the epoxidized tannin is 100-300 g/mol.

4. The method of claim 1, wherein: step (g) further comprises the sub-steps of:

(g1) adding the epoxidized tannin and the triethylene tetramine in a proportion [$n_{epoxidized\ tannin}: n_{triethylene\ tetramine} = 1:1$] to a single-necked flask;

(g2) maintaining the single-necked flask at 60° C. for four hours;

(g3) transferring the single-necked flask to an oil bath pan; and (g4) heating the oil bath pan to 120° C.; and step (h) further comprises the sub-steps of:

(h1) adding urea to the heated oil bath pan;

(h2) maintaining the oil bath pan at 120° C. for 12 hours to obtain an epoxidized tannin based polyurea prepolymer; and (h3) adding water to the epoxidized tannin based polyurea prepolymer until a 55-65 wt % aqueous solution is obtained, wherein the 55-65 wt % aqueous solution is the water-resistant tannin-based wood adhesive.

* * * * *